United States Patent
Carlson et al.

(10) Patent No.: US 7,693,122 B2
(45) Date of Patent: Apr. 6, 2010

(54) RESOURCE RESERVATION IN A WIRELESS NETWORK WITH DISTRIBUTED MEDIUM ACCESS CONTROL

(75) Inventors: Emma Carlson, Oslo (NO); Holger Karl, Paderborn (DE); Christian Prehofer, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 649 days.

(21) Appl. No.: 10/569,108

(22) PCT Filed: Aug. 21, 2003

(86) PCT No.: PCT/EP03/09293

§ 371 (c)(1),
(2), (4) Date: Feb. 21, 2006

(87) PCT Pub. No.: WO2005/020517

PCT Pub. Date: Mar. 3, 2005

(65) Prior Publication Data

US 2007/0002821 A1 Jan. 4, 2007

(51) Int. Cl.
*H04W 4/00* (2006.01)
*H04B 7/212* (2006.01)
*H04W 72/00* (2006.01)
*H04B 7/00* (2006.01)

(52) U.S. Cl. ............... 370/341; 370/328; 370/329; 370/338; 370/348; 370/443; 455/450; 455/509

(58) Field of Classification Search ............... 455/41.2, 455/432.3, 435.1–435.3, 434, 436–451, 452.1–452.2, 455/453, 455, 463–464, 500, 509–517, 403, 455/466, 550.1, 556.2, 560; 370/322, 328–329, 370/331–338, 341–345, 348–350, 431–432, 370/437, 441, 443–445, 450, 462, 908, 912–913, 370/310, 400–401, 408, 418, 439; 709/218, 709/226, 228–229; 379/88.17–88.2, 220.01, 379/221.15, 219, 225, 900–901

See application file for complete search history.

(56) References Cited

U.S. PATENT DOCUMENTS

| | | | |
|---|---|---|---|
| 5,307,509 A | 4/1994 | Michalon et al. | |
| 5,446,734 A | 8/1995 | Goldstein | |
| 5,638,377 A * | 6/1997 | Quinquis et al. | 370/392 |
| 5,646,936 A | 7/1997 | Shah et al. | |
| 5,872,773 A | 2/1999 | Katzela et al. | |
| 5,912,921 A * | 6/1999 | Warren et al. | 375/220 |
| 5,951,637 A * | 9/1999 | Kuzma | 709/204 |
| 5,956,341 A * | 9/1999 | Galand et al. | 370/412 |
| 6,049,549 A | 4/2000 | Ganz et al. | |
| 6,687,228 B1 * | 2/2004 | Fichou et al. | 370/232 |
| 6,715,055 B1 * | 3/2004 | Hughes | 711/170 |
| 7,239,631 B1 * | 7/2007 | Prehofer | 370/389 |
| 7,321,587 B2 * | 1/2008 | Gao et al. | 370/388 |
| 2002/0177460 A1 | 11/2002 | Beasley et al. | |
| 2003/0067941 A1 | 4/2003 | Fall | |
| 2004/0109428 A1 * | 6/2004 | Krishnamurthy | 370/338 |

FOREIGN PATENT DOCUMENTS

| | | |
|---|---|---|
| EP | 0 749261 A2 | 12/1996 |
| JP | 10065601 A | 3/1998 |
| JP | 2005-508148 | 11/2008 |
| WO | WO-03028315 A1 | 4/2003 |

OTHER PUBLICATIONS

International Preliminary Examination Report (Nov. 30, 2005) including International Search Report (Jan. 20, 2005).

* cited by examiner

*Primary Examiner*—Meless N Zewdu
(74) *Attorney, Agent, or Firm*—Nutter McClennen & Fish LLP; John J. Penny, Jr.

(57) ABSTRACT

A wireless network with distributed medium access control allows establishing of a virtual channel between a source node and a destination node via at least one intermediate node. The virtual channel may be established for the entire duration of a communication between the source node and the destination node, and, to establish the virtual channel, a request handler can transmit a virtual channel request, requesting an allocation of transmission resources for the virtual channel. Based on the virtual channel request, a virtual channel confirmation can be generated by the destination node and can be returned to the source node, indicating an allocation of the resources for the virtual channel. A communication handler can then transmit data from the source node to the destination node using the available transmission resources.

21 Claims, 7 Drawing Sheets

RESOURCE RESERVATION IN A WIRELESS NETWORK WITH DISTRIBUTED MEDIUM ACCESS CONTROL

FIELD OF THE INVENTION

The invention relates to a reservation of resources for virtual channels in a wireless network with distributed medium access control.

TECHNOLOGICAL BACKGROUND

Wireless communication networks are becoming increasingly popular and co-exist with or may even replace traditional wireline communication networks. Wireless communication network enable users to wirelessly transmit information to other users, such as for a telephone conversation between users of telephone terminals or a data communication between computing devices. A mobile telephone is one type of wireless communication device which is widely used in voice and/or data communications. Similarly, a mobile computer may be used as a wireless communication device and may enabled to connect to a wireless communication network for data transmissions and/or for assisting in voice communications.

Wireless communication networks include mobile communication networks, such as networks according to the GSM (global system for mobile communications) standard, UMTS (universal mobile telephone system) and similar. Mobile devices can generally freely move within at least a coverage area of the mobile communication network, even during an ongoing communication. Another type of wireless communication network is a communication network for fixed wireless devices, i.e., devices which are wirelessly connected to the network, but are only allowed to move within a certain fixed local area of the coverage area of the wireless network during an ongoing communication.

A further type of wireless communication network is a wireless network with distributed medium access, i.e., a network without a central control facility for managing resources, etc. While many types of wireless communication networks employ a central control facility, wireless networks with distributed medium access control use a decentralized access to communication resources, essentially allowing the individual participants of the network to negotiate access to resources among one another.

An ad-hoc communications network may be configured as a wireless network with distributed medium access control, constituting a network with dynamic behaviour and composition, where an availability of resources and e.g. a coverage area depends on the participating network elements or nodes.

Various factors in association with technology, business, regulatory issues and social behaviour have driven the spreading of wireless ad-hoc networks. An ad-hoc network may consist of a plurality of wireless devices using a wireless interface for an exchange of data, such as packet data or continuous streams of data. Each wireless device may serve as a communication node, being responsible for forwarding data on behalf of other communication devices, and may at the same time be running user applications on behalf of a user of the communication device, such as communication services. Various kinds of ad-hoc networks exist, including networks having mobile nodes and/or fixed wireless nodes, networks that rely on packetized data transfer, or on direct communication links or any kind of connection-less links.

In a typical communication network with distributed access control, to establish a communication link between two parties, a communication path is established through a number of communication devices or network nodes participating in the relaying of the data between the two communicating parties, i.e., nodes relay information or data packets on behalf of other nodes. This approach is termed multi-hopping and allows advantages such as a better reuse of resources of the network and a decrease of a transmit power of the system, since the individual 'hops' between nodes only involve a short distance which can be covered without requiring large transmission power.

One standard for wireless communication networks with distributed medium access control is the IEEE 802.11 standard "Wireless LAN and medium access control (MAC) and physical layer PHY) specification", 1999. A network in accordance with IEEE 802.11, or another wireless communication network may provide for a distributed access control to use communication resources, wherein, if a communication device wants to transmit a chunk of information or data packet on a transmission path covering a plurality of nodes of the network, it first contends for access. Generally, this contention is made at each of the participating nodes.

However, if further data packets are to be transmitted via the transmission path, the access procedure is performed by each of the participating nodes for each data packet of a data packet flow, i.e., performed separately for each data packet, even if the data packets belong to the same data flow. This introduces a large overhead, as the transmission of each single packet is negotiated.

Moreover, individual transmission of each packet may very well lead to different transmission paths for the individual packets, which in turn may lead to different transmission delays for the packet and sequential packets of one data stream may be received in reversed order. This causes problems in delay sensitive applications such as voice or real time transmission, resulting in reduced end-user perceived quality.

SUMMARY OF THE INVENTION

It is therefore an object of the invention to reduce an overhead for transmitting information in wireless networks with distributed medium access control and to improve a user perceived quality of service.

The object of the invention is solved by a method for virtual channel reservation in a wireless network with distributed medium access control, including transmitting, from a source node, a virtual channel request over a transmission path including at least one intermediate node to a destination node, the virtual channel request requesting an allocation of transmission resources for a virtual channel from the source node through the at least one intermediate to the destination node, receiving a virtual channel confirmation from the destination node, the virtual channel confirmation indicating an allocation of the resources for the virtual channel, and transmitting data from the source node the destination node using the allocated transmission resources.

The invention thus enables establishing a virtual channel for transmitting data between a source node and a destination node, eliminating the need of repeated negotiation of communication resources for individual portions of the data to be transmitted. Further, as the data to be transmitted from the source node to the destination node are transmitted via the same virtual channel, a reversal of original order of portions of the data is avoided. This allow to improve a user received quality especially in applications having a quantity of service requirement, such as real time voice communication and similar.

The transmission resources for the virtual channel may include at least one of a repeating time period for transmission and a transmission frequency. Thus, the invention can be implemented in connection with access schemes involving access to a transmission medium using allocated time periods and allows access to a transmission medium using an assignment of transmission frequencies or combined a process.

The virtual channel request may include reservation information on at least one of the duration of a time period, a repetition of the time period and a time reference. The request can therefore include all information required for nodes along the transmission path.

The reservation information may be transmitted in association with messages or data packets according to a communication protocol, particularly according to the IEEE 802.11 standard.

According to an advantageous embodiment, the source node may listen to signalling between other nodes of the wireless network in order to determine unreserved transmission resources in the wireless network. Thus, prior to transmitting the virtual channel request the source node may already contain information on the availability of resources and may take this into account when generating the virtual request.

Consequently, the virtual channel request may request an establishment of the virtual channel using the determined unreserved transmission resources.

Moreover, the source node or another node may analyze virtual channel requests or data packets including reservation information of other node, or analyze release messages, to determine at least one of unreserved time periods, a transmission frequency and a transmission code.

According to another alternative, the virtual channel request may request the at least one intermediate node and the destination node to determination transmission resources for the virtual channel and to reserve the transmission resources, if available. Thus, the task of determining the transmission resources may also be performed by the intermediate node and/or the destination node.

Each of the at least one intermediate node and the destination node, if available transmission capacity during the repeating time period is not available, may determine alternate available transmission capacity during an alternate repeating time period.

Still further, each of the at least one intermediate node and the destination made may calculate individual time delays associated with a transmission using the alternate available transmission capacity and may report same to the source node, e.g. using the virtual channel confirmation. The source node may then determine a total time delay for the virtual channel based on individual time delays and may accept the virtual channel, if the total time delay does not exceed a predetermined maximum delay.

According to another alternative, additional node present in or moving into the wireless network may determine unreserved transmission resources and may start transmission of data during the unreserved transmission resources. Further, an additional node present in or moving into the wireless network may analyse virtual channel requests or data packets including reservation information or release information of other nodes to determine the unreserved transmission resources.

According to another alternative, the transmission path between the source node and the destination node may be monitored to determine whether at least one of the intermediate nodes leaves the wireless network or if a connection is disturbed or broken. If one of the at least of the intermediate nodes leaves the wireless network or if a connection is disturbed or broken, the source node may emit an additional virtual channel request to re-establish the virtual channel through an alternate path. Further, if one of the at least one intermediate nodes leaves the wireless networks, an intermediate node preceding the leaving intermediate node may determine an alternative path for the virtual channel to an intermediate node succeeding the leaving intermediate node.

Alternatively, if a connection between nodes is disturbed or broken, i.e. nodes along the communication path, it may be determined at an intermediate node preceding the disturbed or broken connection an alternate path for the virtual channel to an intermediate node succeeding the disturbed or broken connection.

According to another embodiment, the source node, the at lest one intermediate node and the destination node may synchronize clocks using the periodic transmission of a virtual channel.

Further, the wireless network may be a multi hop wireless ad hoc network and/or may form part of a cellular network.

A program may have instructions adapted to carry out the operations outlined above. Further, a computer readable medium may be provided, in which a program is embodied, where the program is to make a data processing device execute any of the above operations. A computer program product may comprising the computer readable medium.

The object of the invention is further solved by a source node in a wireless network with distributed medium access control, including a request handler for transmitting a virtual channel request over a transmission path including one intermediate node to a destination node, the virtual channel requesting an allocation of transmission resources for a virtual channel from a resource node through the at least one intermediate node to the destination node and for receiving a virtual channel confirmation from the destination node, the virtual channel confirmation indicating an allocation of the resources for the virtual channel, and a communication handler for transmitting data from the source node to the destination node using the allocated transmission resources.

Further advantageous embodiments of the invention are disclosed in further dependent claims.

DETAILED DESCRIPTION OF PREFERRED EMBODIMENTS

Figure 1:
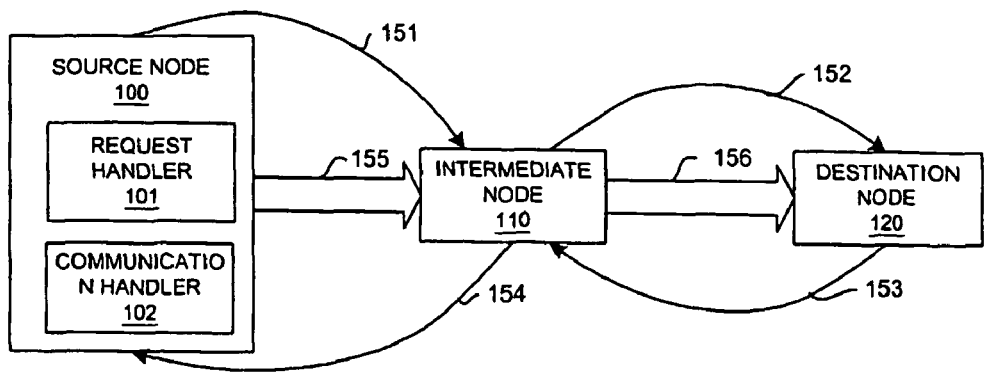
FIG. 1 illustrates elements of a wireless network for distributed medium access control for establishing a virtual channel according to an embodiment of the invention.

FIG. 1 illustrates elements of a wireless system with distributed medium access control for establishing a virtual channel according to an embodiment of the invention.

FIG. 1 illustrates a portion of a wireless system including a source node 100, an intermediate node 110, a destination node 120 involved in establishing a virtual channel between the source node and the destination node. In practical cases the wireless system may have a far larger number of communication nodes which may or may not act as further intermediate nodes between the source node and the destination node.

The source node 100 includes a request handler 101 for transmitting a virtual channel request over a transmission path to the destination node 120 via at least one intermediate node, of which the intermediate node 110 is shown as an exemplary 1. The virtual channel request emitted by the request handler 101 requests an allocation of transmission resources for a virtual channel from the source node through the intermediate node to the destination node. In response to the virtual channel request, the request handler 101 receives a virtual channel confirmation from the destination node, e.g. via the transmission path including the intermediate node 110, the virtual channel confirmation indicating an allocation of the resources for the virtual channel.

Further, the source node 100 includes a communication handler 102 for transmitting user data from the source node to the destination node via the intermediate node using the allocated transmission resources. The user data may be associated with an application executed at the source node or at any other element of the wireless system or an element connected to the source node.

The communication handler 102 may be configured to transmit, during a communication, data belonging to flow of information from the source node to the destination node, e.g. a data stream or a sequence of data packets including payload information. The virtual channel can advantageously be used throughout the entire duration of the communication between the source node and the destination node, after ending the communication, the virtual channel may be released, e.g. using a timeout at each of the participating nodes or using a release message issued by the source node towards the destination node.

With the invention it becomes possible to establish a virtual channel in a network with distributed medium access control for the entire duration of a communication between a source node and a destination node via an arbitrary number of intermediate nodes. A communication overhead for negotiating transmission resources for portions of data pertaining to a communication can be eliminated, and thus the transmission capacity for user information can be increased. Further, as the virtual channel between the source node and the destination node generally is the same during the entire transmission, portions of data pertaining to a communication will be received in the order they were transmitted. This is particularly advantageous in case of packetized data transmissions, eliminating problems with receiving packets in inverted order, i.e., receiving a data packet at the destination node before another packet which was transmitted earlier. This improves a user-perceived quality of services, particularly for real time applications and any other applications sensitive to data delays.

The invention thus provides for a reduced communication overhead and processing requirement for establishing and maintaining communications in a wireless system with distributed medium access control, such as a wireless ad-hoc network with distributed medium access control, including a wireless network in accordance with the IEEE 802.11 standard. In a wireless network in accordance with the IEEE 802.11 standard the reservation messages for virtual channel reservation can be added on existing messages and/or data messages, thus requiring only minimal adaptations to a wireless system operating under the IEEE 802.11 standard.

However, the above outlined scheme for establishing a virtual channel in a network with distributed medium access control can be applied to any other wireless communication network, provided each of the nodes of the network are allowed or enabled to request a virtual channel to an arbitrary one of the nodes of the network for transmitting data therebetween. The includes any kind of network environment, including networks with CSMA (Carrier Sense Multiple Access) or CSMA/CA structure, time-based access schemes, frequency-based access schemes, code division access schemes or combined approaches thereof.

Accordingly, according to an example, the virtual channel request may include a request for a repeating time period for a transmissions from the source node to the destination node, the repeating time period specifying a time period to be used by the source node and similarly the intermediate node or nodes for the transmission of data over a transmission carrier. The repeating time period can consist of a number of timeslots of networks with time-based access schemes or may specify any other kind of time period for the virtual channel. The time period requested for allocation of the virtual channel may repeat periodically, such as every 20 ms for the duration of 1 ms or any other repetition rate and duration. Alternatively, the repeating time period may be repeated in irregular intervals, for example if the virtual channel requires a higher data rate at one point in time and a lower data rate at another point in time.

In case of an allocation of a repeating time period, the virtual channel request may advantageously include a reservation information pertaining to at least one of the duration of the requested time period, the repetition frequency or period of the time period and/or a time reference. The time reference can facilitate synchronization of transmissions between the individual nodes of the wireless network. Particularly, if the wireless network lacks a central control facility, such as a wireless network with distributed medium access control, there may be no overall valid time reference available in the network. Therefore, including a time reference into the virtual channel can be used by all participating nodes, i.e. the intermediate node and the destination node shown in FIG. 1, to synchronies or schedule allocation of resources for the requested virtual channel and/or any other virtual channel. The time reference could for example be related to the start of transmissions of the virtual channel request from the source node, or could relate to any other event at the source node or other element of the wireless network. The time reference can be used to synchronies internal clocks at the nodes of the network, particularly the nodes participating in the virtual channel.

Further, the clocks of the participating nodes or any other node of the network may be synchronized using the periodic transmissions of a virtual channel. The virtual channel used for synchronizing clocks may be constituted by the virtual channel to be established, as outlined above, or may pertain to any other virtual channel, including periodic transmissions of a virtual channel solely for the purpose of synchronizing clocks of nodes of the wireless network.

According to another example, the transmission resources requested for the virtual channel may include a transmission frequency, e.g. in a frequency-based access approach. This frequency may be one of a plurality of transmission frequencies available in the network with distributed access control or a portion of a bandwidth available for communications in the network with distributed medium access control.

According to still another example the transmission resources requested in the virtual channel request may pertain to access codes in a network, such as in a CDMA network (code division multiple access network). In this case the virtual channel request could request allocation of one or a plurality of codes or spreading codes for transmitting the data between the source node and the destination node.

Combined approaches combining the above three schemes are possible, i.e., the requested transmission resources could include a combination of requesting a time period, a transmission frequency and a transmission code.

As noted above, the wireless network may be a multi-hop wireless network, such as an ad-hoc network, or may form part of a cellular network. Therefore, while the requested virtual channel may use the same transmission resources along the entire communication path from the source node to the destination node, it is also possible that different resources are requested or made available for different portions of the transmission path, e.g. a first type of transmission resources may be made available on a portion of the transmission path from the source node 100 to the intermediate node 110, and a second type of transmission resources may be made available along the portion of the transmission path from the intermediate node 110 to the destination node 120.

In order to make use of existing resources of a wireless network, the source node may transmit the reservation information of the virtual channel request in association with any message or data packets according to a communication protocol used in the wireless network, such as according to the IEEE 802.11 standard. The reservation information may be included into user data fields or specifically provided fields of data frames transmitted in the network, in which case the exchange or reservation information can be simplified and make use of existing resources of the network.

Moreover, the reservation information transmitted in the wireless network separately or in association with existing messages in the network can be used to spread reservation information on allocated resources of the network to all participating nodes of the network.

Accordingly, each node of the network may maintain information on occupied or available resources of the network or of a portion of the network, and therefore interfering transmissions originating from different nodes can be avoided.

Further, the nodes in the vicinity of a transmitting node can listen to the reservation messages of the other node, and they can record these to avoid sending/reserving time intervals already in use by others.

Similarly, information on a terminated virtual channel, i.e. information pertaining to resources which can be released, can be spread to other nodes of the network. For example, the nodes in the vicinity of a node transmitting a release message can listen to the release message and correspondingly be informed that the resources of a virtual channel can now be reused for further transmission activities, e.g. in association with another virtual channel.

In the following an exemplary operation of the wireless system shown in FIG. 1 will be described.

Initially, the request handler 101 at the source node 100 generates a virtual channel request, requesting the allocation of transmission resources, and will send this reservation request along a transmission path towards the destination node 120, as indicated at arrow 151 in FIG. 1.

The virtual channel request is received at the intermediate node 110 which in response thereto will try to determine and/or allocate the requested resources for transmission. Then, the intermediate node 110 forwards the virtual channel request towards the destination node 120, as indicated at arrow 150. The virtual channel request is received at the destination node 120, and the destination node will proceed to determine and/or allocate the requested transmission resources.

Further thereto, the destination node 120 returns a virtual channel response towards the source node 100, as illustrated by the arrow 153 in FIG. 1. The virtual channel confirmation is received at the intermediate node 110 and, e.g. after appropriate processing, is forwarded to the source node 100, as indicated by arrow 154 in FIG. 1.

Alternatively, each of the participating nodes may return an acknowledgement or virtual channel confirmation to further intermediate nodes, the destination node and/or the source node, indicating availability and/or reservation of the requested resources at the respective node.

Still further, if the required communication resources are unavailable at one of the nodes, this node could notify all remaining nodes along the communication path, e.g. using a negative acknowledgement, so that further reservation operations can be terminated and reserved resources again be released.

The virtual channel confirmation may indicate the availability and/or allocation of transmission resources for the virtual channel, preferably the requested communication resources. after receiving the virtual channel confirmation, the communication handler 102 at the source node may use the allocated resources for transmission of data from the source node to the destination node along the virtual channel, indicated at 155 and 156.

It is noted that using the above scheme, an individual handshake between the individual nodes participating in the transmission for each portion of the data to be transmitted is not necessary, data can be transmitted via the virtual channel, once established, directly without requiring overhead for any further handshake procedure. Further, as it is known at least along the entire transmission path that the resources are allocated for the requested virtual channel, a contention for transmission capacity for each portion of the data is not necessary, avoiding the overhead of contention procedures for portions of data, such as data packets.

In a wireless network with distributed medium access control there will be generally a plurality of possible communication paths between a source node an a destination node via one or a plurality of intermediate nodes. Which path will be the best or be chosen for the virtual channel, i.e. which intermediate nodes should participate in establishing the virtual channel, may be negotiated between a plurality of candidate intermediate nodes and may take into account a processing load at individual intermediate nodes and processing capacity, required transmission power, the length and delay of the path and similar. Wireless communication network with distributed medium access control generally provide means for routing a portion of data pertaining to a communication from a source node to a destination node, such as the IEEE 802.11 standard, and these mechanisms may be employed by the invention in establishing the virtual channel between the source node and the destination node, e.g. instead of a connection for a single packet, the connection can be used for a virtual channel.

Further, it is possible that the virtual channel request, the virtual channel confirmation and the data pertaining to the virtual channel are transmitted via the exact same path, however, it is also possible that for example the virtual channel confirmation is transmitted via another path from the destination node to the source node.

The virtual channel will preferably be maintained as long as data need to be transmitted from the source node to the destination node and be released thereafter. According to one alternative, the resources allocated for the virtual channel may be released by transmitting a specific release message along the virtual channel, i.e. along the communication path from the source node through the intermediate node or nodes to the destination node, notifying each of the participating nodes that all resources allocated in connection with the virtual channel can be released. Further, this release information can also be spread to further nodes of the network for information and purposes and transmission planning, even if they do not participate in the virtual channel. Alternatively or in addition thereto, a timeout function may be implemented in each of the participating nodes, monitoring the transmission activity via the virtual channel, i.e. using the allocated transmission resources such as time period, transmission frequency or code, and releasing the allocated resources for the virtual channel, if no transmission activity can be detected for more than a predetermined time duration.

In the following, further examples of the elements shown in FIG. 1 will be outlined in further detail. It is noted that the following constitutes illustrating examples only and should not be construed as limiting the invention.

The wireless system for distributed medium access control shown in FIG. 1 may be any kind of wireless network, such as a wireless network with time-based access schemes, frequency-based access-schemes or code-based access-schemes, or combinations thereof. For example, the wireless network may operate according to the IEEE 802.11 standard and may constitute a wireless ad-hoc network with distributed medium access control. For example, information about the virtual channel may be included in headers of packets which are not part of the virtual channel flow. This may include some or all message types used by the standard IEEE 802.11, including RTS, CTS, DATA and ACK. By extending the IEEE 802.11 MAC scheme in this way, networks operating according to the IEEE 802.11 standard can readily be adapted to support the signaling according to the invention.

Further, the wireless system shown in FIG. 1 can be integrated into any existing wireless communication network, including mobile communication networks such as networks operating in accordance with the GSM standard, or the UMTS standard.

Moreover, while FIG. 1 only shows three nodes of the wireless network, generally many more nodes will be present and there may be more than one intermediate node between the source node and the destination node. The size and shape of the wireless network may change depending on the participating nodes of the networks, and it is possible that nodes dynamically enter the operating network or leave the operating network. Moreover, it is possible that a transmission path between the source node and the destination node partially uses transmission facilities of other networks, such as wire line communication networks, other wireless or mobile communication networks, etc. For example, if the wireless system is established in two geographically disjoined regions, a transmission of data between the disjoined regions may make use of any other communication system.

The source node 100 may be any kind of device suitable for transmitting, receiving and/or relaying information in the wireless network, such as a wireless telephone, a wireless computing device and similar. Preferably the source node 100 may includes a processing element and a memory, and suitable communication resources for transmitting and receiving information to other nodes of the network via the air interface. In one example the source node may include a memory for storing sequences of instructions which, when loaded to a processor, make the processor execute the functionality of the request handler 101 and the communication handler 102, as detailed above. Moreover, at least part of the request handler and/or communication handler can be realized as dedicated hardware or combinations of software and hardware approaches. The virtual channel request may be transmitted by the request handler via the air interface, and similarly the virtual channel confirmation will be received via the air interface. Further, all data transmissions via the allocated virtual channel may take place via the air interface of the source node.

The source node may transmit information in association with an application executed at the source node, such as a communication application, any computer application such as text processing applications, imaging applications and similar, or may forward data received from another element connected to the source node (not illustrated in FIG. 1). Accordingly, the source node may transmit data on its own behalf or may relay information on the behalf of another device. Moreover, the source node may establish or request a plurality of virtual channels to a plurality of destination nodes.

The intermediate node 110 may generally have a similar composition, and the source node, i.e., may also be any kind of wireless device, including a wireless telephone or computing device. Further, the intermediate node preferably has means to receive the virtual channel request from the source node, to determine the availability of the requested resources and to forward the virtual channel request to the destination node, e.g. via further intermediate nodes. Further, the intermediate node has means for receiving the virtual channel confirmation, notifying the intermediate node that the virtual channel using the resources can be established. Moreover, the intermediate node has means to forward the virtual channel confirmation to the source node, and consequently to receive and forward data pertaining to the virtual channel from the source node to the destination node. As noted above, individual handshake and contention operation for the transmission of data, e.g. data packets, are not necessary, as the transmission resources are well defined and allocated. The intermediate node may itself be the source of or destination of further virtual channels, as also the source node.

The destination node 120 may also have a similar composition as the source node and the intermediate node, i.e. be any kind of wireless device including a wireless telephone and wireless computing device. The destination node has means to receive the virtual channel request from the source node and to analyze the virtual channel request, and to allocate the requested resources. Further, the destination node has means to generate a virtual channel confirmation, indicating the allocation of the virtual channel and to transmit same to the intermediate node. Still further, the destination node has means to receive data via the virtual channel from the intermediate node. The destination node, as already the intermediate node and source node, may also be the source or destination of further virtual channels.

It is noted that, even though FIG. 1 shows a direction of a dataflow via the virtual channel from the source node to the destination node, as indicated at 155 and 156, the virtual channel may be bi-directional, for example in certain real time or voice communication applications. In this case the allocation of resources may include the reservation of resources for a transmission of data from the source node to the destination node and from the destination node to the source node. This bi-directional virtual channel may be requested by the source node, specifying the sources for the forward and reverse direction of the virtual channel. Further, the virtual channel portion from the source node to the destination node may be requested using the virtual channel request from the source node, and the reverse direction, i.e., the portion of the virtual channel from the destination node to the source node may be requested within a virtual channel request issued by the destination node. In the latter case the destination node may include a virtual channel request into a virtual channel confirmation message transmitted towards the source node. The intermediate nodes can analyze the virtual channel confirmation and correspondingly allocate resources also for the reverse direction.

In the following, a further embodiment of the invention will be described with regards to FIG. 2.

Figure 2:
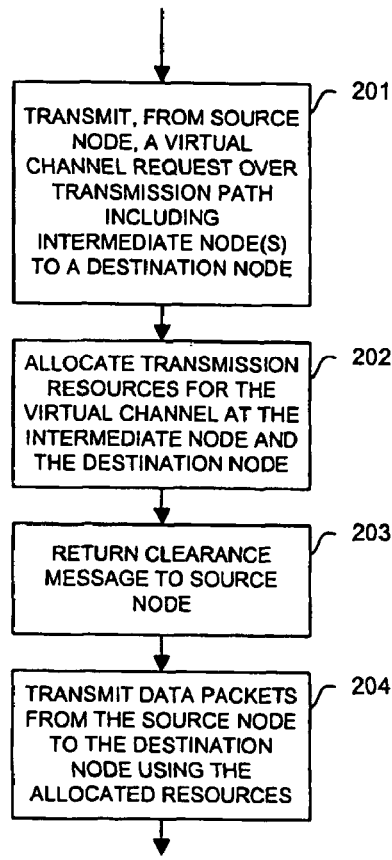
FIG. 2 illustrates operations for distributed medium access control in a wireless system to establish a virtual channel according to an embodiment of the invention.

FIG. 2 illustrates operations of a method in a wireless system with distributed medium access control for establishing a virtual channel. The operations shown in FIG. 2 may be executed using the system shown in FIG. 1, however, the embodiment of FIG. 2 is not limited thereto.

In a first operation 201 the source node transmits a virtual channel request over a transmission path including at least one intermediate node to a destination node. The virtual channel request is forwarded via the at least one intermediate node towards the destination node, such as via the intermediate node 110 shown in FIG. 1 to the destination node 120 shown in FIG. 1, e.g. as noted before.

A transmission path from the source node to the destination node may be selected according to any suitable scheme, and may make use of existing identification schemes, e.g. according to a resource access protocol of the wireless network, including any known standard, such as IEEE 802.11.

In an operation 202 the intermediate node allocates transmission resources for the virtual channel, on the basis of the virtual channel request received from the source nodes. For example, the requested resources may be a repeating time period for transmitting data, a frequency, a code, or combinations thereof, as detailed before. Moreover, in operation 202 the destination node allocates the transmission resources for the virtual channel requested with the virtual channel request, as detailed before. The intermediate node or the plurality of intermediate nodes may include an indication into the virtual channel request forwarded towards the destination node, indicating that the requested transmission resources for the virtual channel are available or have already been successfully allocated or reserved.

Thereafter, in an operation 203 the destination node returns a clearance message towards the source node via the at least one intermediate node. The clearance message will preferably be transmitted via the same transmission path as the virtual channel request and the path to be established for the virtual channel, however, another transmission path of the virtual channel confirmation is conceivable.

When transmitting the virtual channel confirmation towards the source node via the transmission path allocated for the virtual channel, each intermediate node may be notified that all participating nodes have successfully allocated the requested transmission resources, and the source node, upon receiving the virtual channel confirmation, is informed that the virtual channel has been established. It is further possible that the virtual channel confirmation may include a simple indication that the requested virtual channel has been or can be established, i.e., that at each of the participating nodes the required communication resources are available or have been reserved, or may include an exact specification of the sources available or allocated. For example, the virtual channel confirmation may include a specification of a transmission resource differing from the requested transmission resources, as it will be detailed with regard to further embodiments.

After receiving the virtual channel confirmation, the source node can proceed to transmit data packets or a data scheme from the source node to the destination node via the virtual channel, i.e., using the allocated resources. Generally, this will include a transmission of data via an air interface towards the intermediate nodes, which will forward the information to the destination node. The transmission, as the transmission resources have been allocated and are well defined, can commence without any further negotiation between the individual participating nodes or contention processing.

Consequently, time required for repeated negotiation of transmission resources can be saved and thus a communication delay can be reduced. Moreover, an overhead required for data transmission between the source node and the destination node can be reduced as compared to the prior art. Still further, as portions of the data to be transmitted, or data packets, are received at the destination node in the same sequence as they were transmitted, a time-consuming re-establishing in original order of the transmitted data portions is not required. Accordingly, the data transmission can be implemented at reduced time delay, transmission requirements and processing requirements.

Still further, as increasing the number of intermediate nodes in the transmission path for the virtual channel does not lead to a significant increase of overhead communications for transmitting data, a larger number of intermediate nodes can be devised and a transmission power required for transmitting the data along the virtual channel from one node to another can be further reduced and the efficiency consequently improved. Moreover, a decreased transmission power leads to improved re-use options of the bandwidth available for transmissions in the wireless system.

In the following a further embodiment of the invention will be described with regard to FIG. 3.

Figure 3:
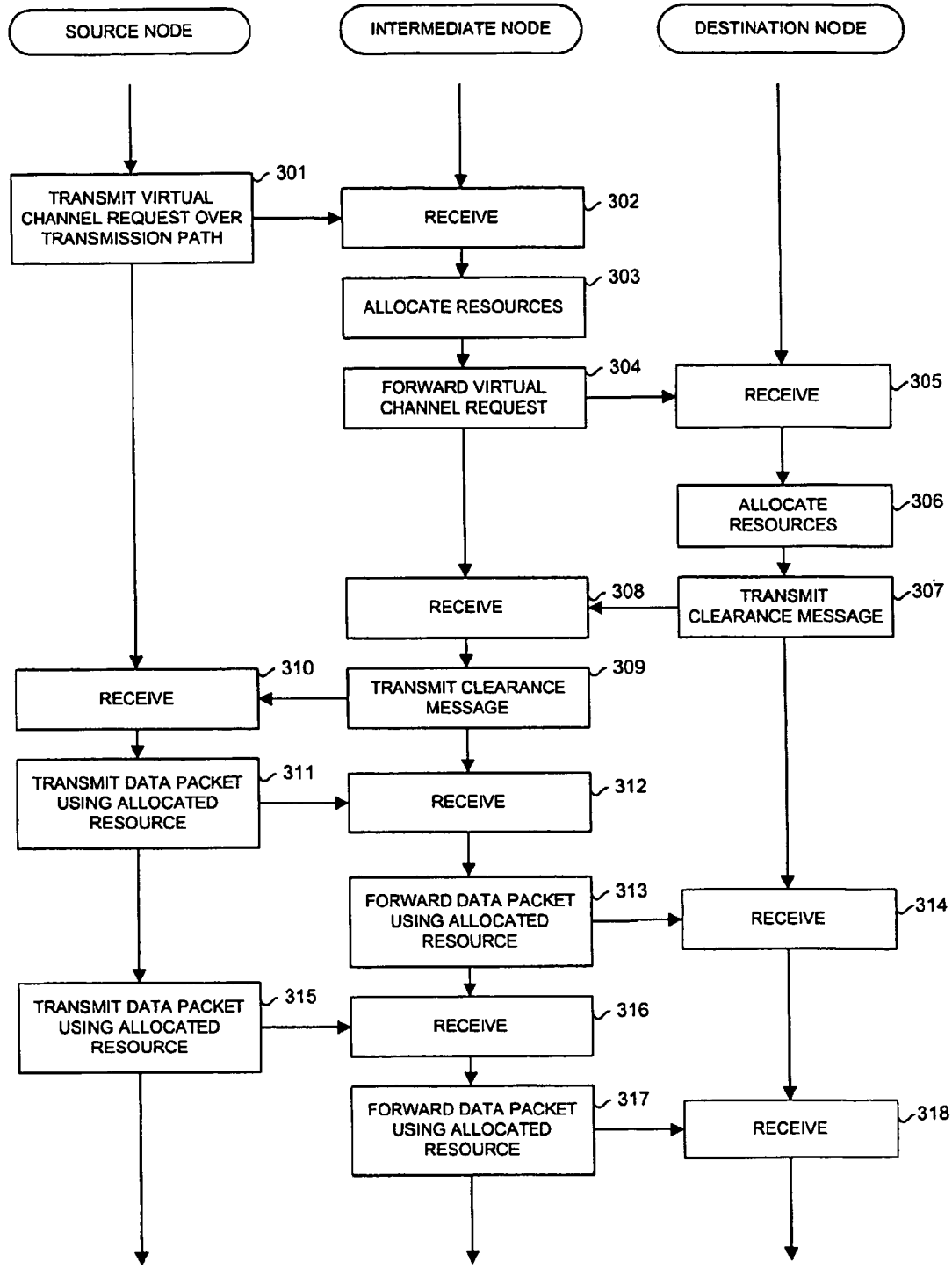
FIG. 3 illustrates operations for distributed medium access control in a wireless system for establishing a virtual channel according to an embodiment of the invention, particularly illustrating operations at a source node, an intermediate node and a destination node.

FIG. 3 illustrates operations in a wireless system for distributed medium access control for reserving a virtual channel between a source node and a destination node via an intermediate node or a plurality of intermediate nodes. The operations shown in FIG. 3 may be carried out using the system shown in FIG. 1, however, the embodiment of FIG. 3 is not limited thereto.

Operations are illustrated for a source node, such as the source node 100 shown in FIG. 1, an exemplary intermediate node, such as the intermediate node 110 shown in FIG. 1, and a destination node, such as the destination node 120 shown in FIG. 1.

In a first operation 301, at the source node such as the source node 100 of FIG. 1, a virtual channel request is transmitted via a transmission path to the intermediate node, such as the intermediate node 110 shown in FIG. 1. The virtual channel request preferably includes information on required resources for the transmission path, e.g. a required data throughput, and may include a detailed specification of the desired transmission resources, as detailed before. Further, the virtual channel request may include information on characteristics of a required service, such as a quality of service indicator, specifying a maximum allowable time delay, specifying a real time requirement or similar.

According to one example the source node may generate the virtual channel request upon receiving a corresponding instruction, such as from a service application executed at the source node or received from a further external device.

The source node may transmit the virtual channel request directly, i.e., without monitoring the communication network, thus risking a collision that this approach may be suitable in wireless networks with low communication load. However, according to another alternative the source node may monitor the transmission activity in the wireless network and may use a currently unoccupied transmission resource, such as an unoccupied time period, frequency or code. In this case the risk of a collision can be greatly reduced, collision may only occur if during the transmission of the virtual channel request, another transmission commences. Still further, according to another alternative, the source node may listen in detail to transmission messages and analyze the transmission messages of the wireless network, in order to determine information on allocated transmission resources, such as resources allocated in further virtual channel requests, or information on allocated resources propagated via the network using existing data messages.

In an operation 302 at the intermediate node the virtual channel request is received and appropriately processed, and in an operation 303 the required resources are allocated. For example, the intermediate node may allocate the resources as requested in the virtual channel request, such as an exactly specified repeating time period, frequency or code. Further, the intermediate node, if the virtual channel request specifies a transmission requirement, determines appropriate resources for meeting the transmission requirements of the virtual general request and allocates these resources. This process may take into account any of the required characteristics of the virtual channel, such as a quality of service indicator and similar.

Thereafter, in an operation 304 at the intermediate node the virtual channel request is forwarded to the destination node, where it is received in an operation 305. In an operation 306 at the destination node the appropriate resources are allocated. This allocation operation may include determining appropriate resources for receiving and further processing of the data transmitted via the virtual channel. Further, if a further transmission beyond the destination node of data is required, the allocation may also be similar to the allocation of resources detailed in operation 303.

Thereafter, in an operation 307 the destination node generates a clearance message, the clearance message transmits same to the intermediate node. The clearance message may include an indication that the requested resources are available or have been successfully allocated at the destination node and/or the intermediate node or nodes. Alternatively, or in addition thereto, the clearance message may include information characterizing the resources available or allocated, e.g. in case the virtual channel request did not specify exactly which resources are desired, but only specified general transmission requirements, such as data rate, etc.

In an operation 308 the clearance message is received at the intermediate node. The intermediate node may include further clearance information into the clearance message, such as an indication of successful reservation of resources or a further specification of reserved resources and, in an operation 309, the intermediate node transmits the clearance message to the source node, where it is received in an operation 310. The source node analyses the clearance message and can now use the requested communication resources for the virtual channel to transmit data.

All participating nodes may record the allocated resources in a resource reservation table and further, the resource reservation information may be propagated also to further not directly participating nodes of the network.

In an operation 311 the source node can then transmit a data packet via the virtual channel using the requested resources or the resources indicated as allocated in the clearance message. Alternatively, the data stream may now be transmitted via the virtual channel using the resources. The data packet or data stream can include any kind of information, e.g. pertaining to a service application such as a communication application or data processing application. If the data is present in a continuous stream, the source node may packetized the data to transmit the data packets, e.g. via the allocated time periods.

In an operation 312 the intermediate node receives the data packet or portion of the data stream and forwards the data packet or stream using the allocated resources. A handshake between the intermediate node and the source node for transmitting the data packet or portion of the data stream is not required, as the transmission resources to be used for the virtual channel have been fully specified beforehand.

In operation 313 the intermediate node forwards the data packet using the allocated resources to the destination node (where it is received in operation 314). Similarly, a handshake between the destination node and the intermediate node is not required, as the transmission resources have been fully specified. Moreover, data contention processing is also eliminated, as collisions are avoided.

In an operation 315 the source node can then transmit further data, e.g. a data packet or portion of a data stream using the allocated resources, e.g. using a further time period of the assigned repeating time period. The further data are received at the intermediate in operation 316, forwarded to the destination node in operation 317 and received thereat at operation 318. Operations 316-318 may be similar to operations 312-314 outlined above.

The operations for transmitting data via the virtual channel may now be repeated or continued as long as necessary, until no further data need to be transmitted from the source node to the destination node. Then, in order to terminate the virtual channel, a release message may be transmitted from the source node via the intermediate node to the destination node, indicating that the virtual channel resources can be released.

Alternatively, as noted before, a time out function may be employed, monitoring the transmission activities on the virtual channel and releasing the virtual channel, if no transmission activity is detected for a certain period of time.

Moreover, alternatively or in addition thereto, a maximum duration for a communication via a virtual channel may be set, and at the end of this time duration the virtual channel, i.e., the resources, could be forcedly released, disregarding any still ongoing communication, to make a the resources available to other parties. The time duration could be set or varied on the basis of an communication load in the system, an overload condition, a number of unsuccessful virtual channel requests in the system, etc.

While FIG. 3 illustrates a data flow from the source node to the destination node, it is noted that the virtual channel may also be bi-directional, in which case the destination node may also transmit data to the source node, as detailed before.

In the following a further embodiment of the invention will now be described with regard to FIG. 4.

Figure 4:
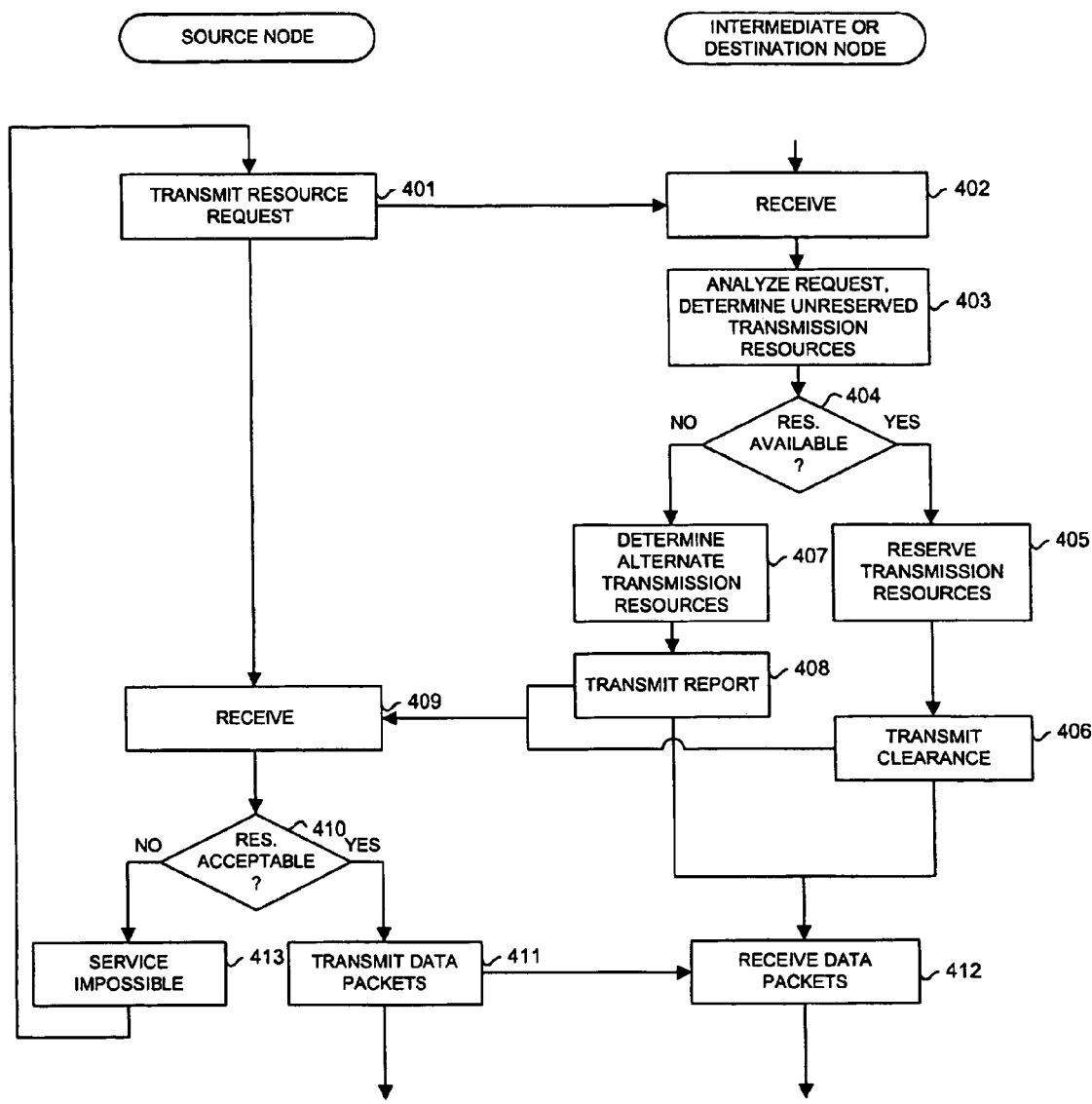
FIG. 4 illustrates operations for distributed medium access control in a wireless system for establishing a virtual channel according to an embodiment of the invention, particularly illustrating operation of a source node and an intermediate or destination node, if the requested resources are unavailable.

FIG. 4 illustrates operations for virtual channel reservation in a wireless system using distributed medium access control, particularly illustrating operations at a source node and an intermediate or destination node in case required transmission resources are not or not fully available. The operations shown in FIG. 4 may be carried out using the system shown in FIG. 1, however, FIG. 4 is not limited thereto.

In a first operation 401 the source node generates a resource request and transmits same via at least one intermediate node to a destination node. As according to the present embodiment the operations to be carried out at the intermediate node(s) and the destination node are substantially the same, the intermediate node(s) and the destination node are jointly visualized in FIG. 4.

The transmission and the contents of the virtual channel request may be as detailed in previous embodiments. In particular, the resource request may include a specification of required resources, such as a specification of a repeating time period, a time reference, or specification of a transmission frequency or transmission code.

The virtual channel request is received at the intermediate node and destination node in an operation 402 and analyzed thereat in an operation 403, e.g. it is determined which resources are requested and consequently are to be allocated. Further, in operation 403 the intermediate or destination node determines unreserved transmission resources, e.g. resources that are currently not in use by any virtual channel.

The allocation may include, at each intermediate node or the destination node, associating resources with a virtual channel, and blocking these resources, so that no other communication operation can reserve them. The resources allocated at a particular node may include resources required for the virtual channel at this particular node but may further include resources required for the requested virtual channel at further nodes, e.g. preceding or succeeding nodes. For example, if a virtual channel requires a first time slot at a first intermediate node and a second time slot at a second intermediate node, both the first time slot and the second time slot need to be reserved at both, the first and second node.

However, if resources such as the first and second time slot are to be reserved in different parts of a network which do not interfere with one another, e.g. because of a large enough distance and associated attenuation of communication signals between both parts of the network, e.g. the first and the second intermediate node, not all of the resources need to be reserved in all parts of the network, e.g. the first time slot may not have to be reserved at the second intermediate node and vice versa, the second time slot may not have to be reserved at the first intermediate node.

Moreover, any node not actively participating in the virtual channel may listen to the reservation message or reservation information and correspondingly note, e.g. in a resource reservation list, that the requested resources are occupied, e.g. the first and the second time slot.

In an operation 404 the intermediate or destination node then decides whether the resources requested with the virtual channel request are available, i.e., determines whether the requested resources are not already reserved.

If in operation 404 the decision is "YES", indicating that the requested resources are available, in an operation 405 the intermediate or destination node reserves the requested transmission resources. The reservation of transmission resources may be carried out by including a corresponding notification into a resource registry, and may also include broadcasting or propagating this information to further nodes of the communication network, in order to make the reservation information available to further elements of the wireless network.

Thereafter, in an operation 406, a clearance message is transmitted from the intermediate or destination node towards the source node.

If in operation 404 the decision is "NO", indicating that the requested resources are not or not fully available, in an operation 407 the intermediate or destination node determine alternate transmission resources, such as another repeating time period, transmission frequency, transmission code or similar. The alternate transmission resources may be determined by investigating, at the intermediate or destination node, the use of transmission resources by other virtual channels or other transmitting elements of the network or other networks.

The determination of alternate transmission resources may include determination of alternate transmission resources for the virtual channel and reservation of the alternate resources, if they are available. For example, if available transmission capacity during a requested repeating time period for the virtual channel is not available, an alternate available transmission capacity during an alternate repeating time period may be determined and may be allocated or offered to the source node.

Further, the intermediate or destination node may determine, in operation 407, a time delay in association with the alternate transmission resources and may report same to the source node. Accordingly, each of the intermediate nodes and/or the destination nodes may calculate individual time delays associated with the transmission using the alternate available transmission capacity and can report same to the source node.

Thereafter, in an operation 408, the destination node transmits a resource report via the intermediate node(s) towards the source node.

In an operation 409, the source node receives the clearance message or the resource report, generated in operations 406 and 408, respectively. In response thereto the source node determines in an operation 410, whether the resources made available for the virtual channel are acceptable. If the resources are available as they were requested, i.e., in case of operations 405 and 406, this will generally be the case. However, if the requested resources were not or not fully available, as indicated in operations 407 and 408, the offered resources may not be sufficient or appropriate for the requirements of the virtual channel. The decision operation 410 may include determining at the source node, whether the offered resources fulfill the minimum requirements of the virtual channel, such as a minimum required service quality, a real time requirement and similar. Further, in operation 410 the source node may calculate a total time delay for the virtual channel based on the individual time delays at the intermediate nodes and the destination node and may accept the virtual channel resources, if the total time delay does not exceed a predetermined maximum delay. Also, the intermediate nodes along the communication path could add delays and forward a cumulative delay to the source node.

If in operation 410 the decision is "YES", indicating that the offered or available resources are acceptable, in an operation 411 the source node commences transmitting data or data packets via the virtual channel towards the intermediate and destination node, where they are received in operation 412. Operations 411 and 412 make use of the communication resources made available for the virtual channel.

However, if in operation 410 the decision is "NO", indicating that the resources offered are not acceptable for establishing the virtual channel, a service impossible message is generated in operation 413, and the flow of operations returns to operation 401, triggering the source node for example to generate and transmit another resource request, e.g. requesting different resources, or transmitting a resource request at a later point in time. Moreover, in operation 413 the source node may transmit a message towards at least the intermediate and destination node, indicating that the resources are not acceptable and that any allocated resources may be again released.

The embodiment outlined with regard to FIG. 4 enables the source node and intermediate nodes and destination node to negotiate transmission resources for the virtual channel and allows the establishment of the virtual channel, if the available resources are acceptable.

In the following a further embodiment of the invention will be described with regard to FIGS. 5a and 5b.

Figure 5A:
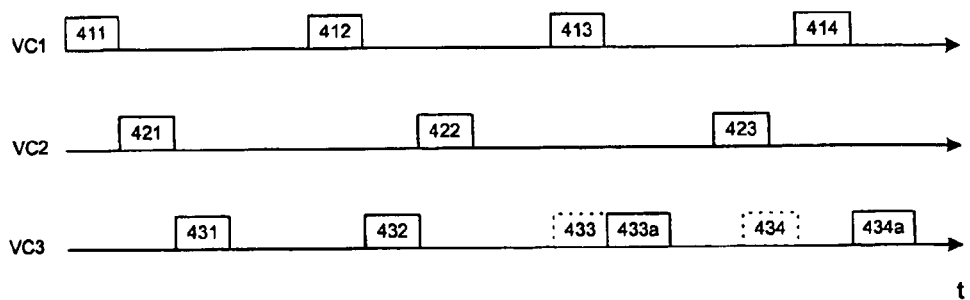
FIGS. 5a and 5b illustrate examples for allocating resources for a virtual channel according to further embodiments of the invention.
Figure 5B:
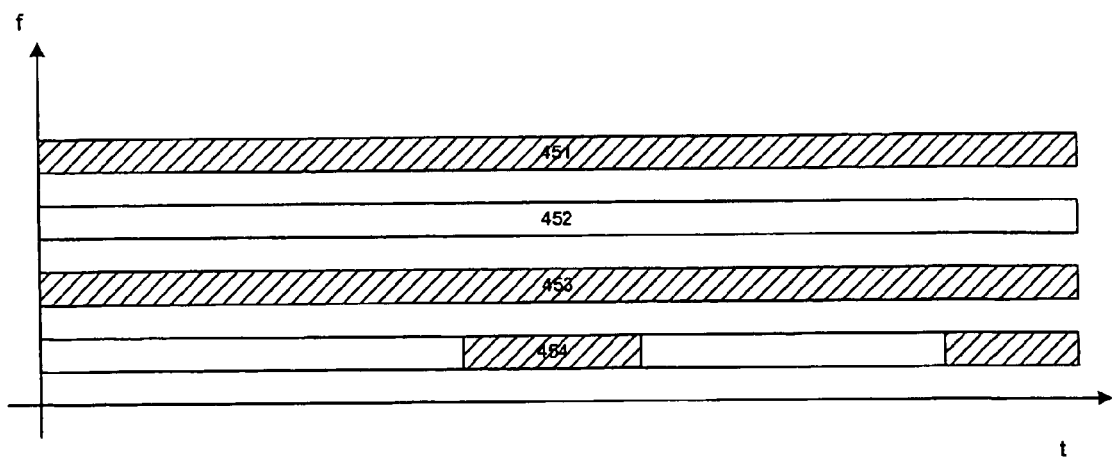

FIGS. 5a and 5b illustrate examples of virtual channels established in a wireless network, with FIG. 5a illustrating examples of virtual channels in a wireless network with a time based distributed access scheme, and FIG. 5b illustrates an example of a wireless network with a frequency based distributed access scheme.

FIG. 5a illustrates three virtual channels VC1, VC2 and VC3 that are to be established one after another, starting with VC1, then VC2 and finally VC3. FIG. 5a may be considered to show for each virtual channel data fields, e.g. data packets, of a portion or all of a data flow from a respective source node to a destination node. Further, the illustration may be considered to show entire virtual channels from source nodes to destination nodes or may be considered to show a portion of a transmission path from source nodes to destination nodes, for example from intermediate nodes to destination node.

In FIG. 5a it is assumed that a source node requests creation of a first virtual channel VC1 during a regular repeating time interval, as indicated by data fields 411, 412, 413 and 414. At this time it is assumed that there are no other ongoing transmissions in the wireless network and therefore the intermediate and/or destination node will have no problem in allocating the requested repeating time period. The data fields may contain data packets pertaining to a communication or partitions of a continuous data stream.

Thereafter, the same or another source node is considered to request establishment of a second virtual channel VC2 to the same or another destination node using transmissions in a second repeating time period, as indicated by fields 421, 422 and 423. As the requested repeating time period makes use of transmissions during time frames which are not already occupied by the virtual channel VC1, the intermediate nodes and/or destination nodes can readily allocate the requested resources and the virtual channel VC2 can be established.

It now is assumed that during ongoing transmissions of virtual channel VC1 and virtual channel VC2, the third virtual channel VC3 is requested using transmissions via a third repeating time period. While it can be seen that initially two repeating time periods can be allocated, i.e., the fields 431 and 432 for the virtual channel VC3, the third time period for transmission, indicated by the dotted field 433, cannot be used, as this time period is already occupied by the first virtual channel VC1. Accordingly, an alternate time frame for transmission will be determined, e.g. a transmission via an alternate field 433a, being delayed. Moreover, transmission via a fourth of the repeating time periods for the third virtual channel, as indicated by the dotted field 434 is not possible, as this time period is partially occupied by the second virtual channel VC2, i.e. the transmission field 423. Therefore, the transmission regarding data field 434 is to be delayed until the transmission carrier is unoccupied, as indicated by transmission field 434a. Using this scheme the third virtual channel VC3 can be accommodated, however, not with the originally requested resources, but by imposing a certain time delay.

Alternatively, the data fields following the data field 433, 433a could be calculated on the basis of the shifted data field 433a, in which case regular time period for all following data fields would be allocated or attempted to be allocated with the data field 433a as a reference.

The individual time delays or an associated reduced data rate, imposed at e.g. an intermediate node, as illustrated for virtual channels VC3, may be reported to the source node and the source node may collect information on a total time delay imposed on a virtual channel. A decision may then be reached whether the transmission resources offered are acceptable, as outlined with regard to FIG. 4.

It is noted that FIG. 5a very schematically illustrates one possible example of virtual channel allocation, any kind of allocation of resources, e.g. time delays, further sub-division of transmission fields of a virtual channel and similar are possible.

FIG. 5b illustrates an example of establishing virtual channels in a system with frequency based distributed access control. It is assumed in FIG. 5b that a frequency band available for transmission in a wireless communication network is sub-divided into individual sub-bands 451, 452, 453 and 454. Further, the hatched portions of the sub-bands are considered to be occupied by ongoing traffic, e.g. for virtual channels already established. FIG. 5b may be further considered to show entire virtual channels from source nodes to destination nodes or may be considered to show a portion of a transmission path from source nodes to destination nodes, for example between intermediate nodes or to destination nodes.

It can be noted that the first sub-band 451 and 453 are fully occupied by ongoing traffic, while the sub-band 452 is not occupied. In this case, accordingly, a virtual channel request may request use of at least portion of the sub-band 452.

Further, it is illustrated in FIG. 5b that the fourth sub-band 454 is partially occupied by ongoing traffic, as illustrated by the hatched portions. This may relate to transmissions in association with a virtual channel during a repeating time period within the sub-band 454.

Consequently, a further virtual channel could be established during the unoccupied portions of the fourth sub-band 454, or a combination of the sub-band 452 and the unoccupied portions of the sub-band 454.

It is noted that FIG. 5b also illustrates only one possible example of frequency based medium access and a combination of time and frequency based access, and that any other access scheme or combinations thereof for virtual channel allocation are conceivable.

In the following a further embodiment of the invention will be described with regard to FIG. 6.

Figure 6:
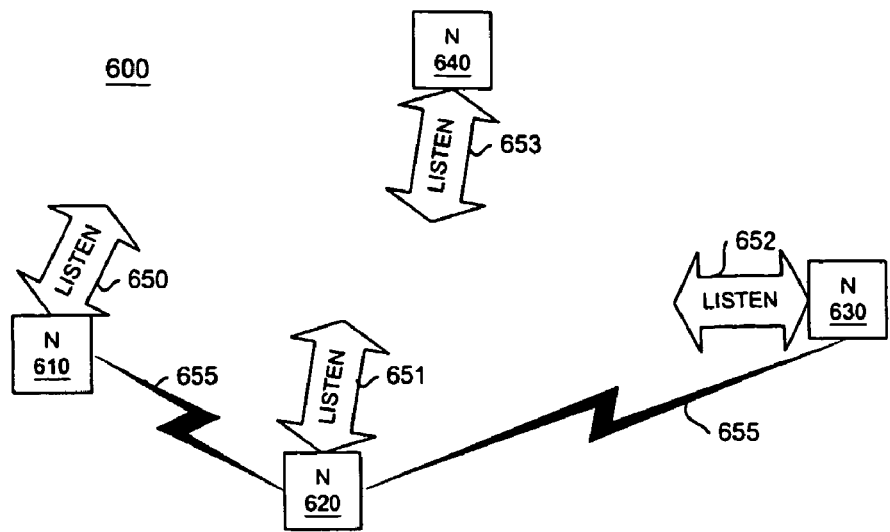
FIG. 6 illustrates elements of a wireless network with distributed medium access control for establishing a virtual channel according to an embodiment of the invention.

FIG. 6 illustrates elements of a wireless system with distributed medium access control, for establishing a virtual channel according to another embodiment of the invention.

FIG. 6 schematically illustrates four exemplary nodes 610, 620, 630 and 640 of a wireless system 600. Further, in the embodiment of FIG. 6 it is assumed that a virtual channel is established between the node 610, the node 630, the node 610 acting as source node and the node 630 acting as destination node. The communication path is assumed to include the node 620 as an intermediate node, with a first portion of the communication path 655 being established between the node 610 and the node 620, and a second portion of the communication path being established between the node 620 and the node 630. The communication path for carrying the virtual channel may be established as it was outlined with regard to any of the previous embodiments, and may be suited for a one-directional transmission or a bi-directional transmission between the nodes 610 and 630.

Further, FIG. 6 illustrates arrows 650, 651, 652 and 653, indicating that the nodes 610-640 are adapted to listen to transmission activities within the wireless system, in order to gain information on the use of communication resources of the system. For example, before establishing the virtual channel along the communication path 655, the node 610 may listen to signaling between other nodes of the wireless network, to determine reserved or unreserved transmission resources of the wireless network. A virtual channel request may then request establishment of the virtual channel along the path 655 using the determined unreserved transmission resources. In addition thereto, the node 610 may analyze virtual channel request or data packets, other nodes including reservation information of other nodes to determine at least one of unreserved time periods and an unreserved transmission frequency or code.

Similarly, the other nodes, prior to requesting allocation of transmission resources on their own, e.g. for another virtual channel, may listen to ongoing communications in the wireless system, to determine reserved and/or unreserved transmission resources, to schedule communication activities.

The determination may include, at each listening node, blocking resources requested for a virtual channel carried by further nodes, so that no other communication operation will request or reserve them. The resources blocked at a listening node may include resources required for a virtual channel at a particular node of a virtual channel, e.g. a node transmitting a message including reservation information pertaining to resources at this particular node, and may further include resources required for the requested virtual channel at further nodes, e.g. preceding or succeeding nodes. This information may directly be included in the reservation information message, or may be deduced by the listening node from further information pertaining to the virtual channel. For example, if a virtual channel requires a first time slot at a first intermediate node and a second time slot at a second intermediate node, both the first time slot and the second time slot may need to be reserved at the listening node. All or some of the nodes may advantageously store reservation tables, the reservation tables indicating the allocation of resources, for example for planning a virtual channel request at a later point in time.

Still further, the nodes 610-640 may propagate the reservation information to further nodes of the wireless system, thus making reservation information available to all interested parties.

Similarly, information on a terminated virtual channel, i.e. information pertaining to resources that can be released, can be spread to any participating nodes of the network. For example, nodes in the network may listen to virtual channel release messages emitted by a source node or any other node, and correspondingly be informed that the released resources can be reused for further transmission activities, e.g. in association with another virtual channel. Thus, nodes participating in a virtual channel and not participating nodes can update reservation tables maintained for scheduling transmission activities.

By listening to ongoing traffic and/or by analyzing virtual channel requests, data packets or other messages with reservation information, the nodes of the system can acquire information on established virtual channels, such as the virtual channel 655 between the node 610 and the node 630.

This information can also be used for planning a possible path for the virtual channel, e.g. avoiding intermediate nodes already having a high communication load. Still further, the reservation information thus made available throughout the wireless system can be used for accounting purposes, in order to appropriately compensate for transmission capacity provided and/or transmission capacity used. For example, the node 620 could be rewarded for relaying the communication information between the node 610 and the node 630, and likewise the node 610 and/or 630 could be charged for using the resources at the intermediate node 620.

Still further, in a dynamic network with a variable number of participating nodes it is possible that a node enters the wireless system, and further it is possible that a node leaves the wireless system. Generally, a node entering the wireless system could signal its availability or make itself otherwise known as a participating node, e.g. by offering communication services upon a request, and further may listen to ongoing communication activities upon entering the network. This allows the entering node to determine available resources for example for virtual channel requests issued at a later point in time by the entering node.

According to another alternative, instead of listening and analyzing information transmitted in messages across the wireless system, a node could simply detect presence or absence of transmission activity and schedule its own transmissions based on this detection result. Therefore, a node could simply use a time period without any ongoing transmissions to emit a virtual channel request, and similarly, may use a transmission frequency without transmission activity for dispatching a virtual channel request.

According to another alternative, it is also possible that nodes directly start transmission, e.g., directly transmit virtual channel requests, without monitoring the transmission activity and/or analyzing messages transmitted in the wireless system. Upon a transmission failure, for example if the virtual channel request was transmitted during another ongoing transmission, the virtual channel request could be retransmitted after a certain time period.

According to another alternative, an additional node present in or moving into the wireless network, and being unaware of existing reservations, may attempt to establish a virtual channel or exchange further information with other nodes that are aware of existing reservations, either directly, or after a certain listening period, as outlined in the above alternatives.

In this case, if the virtual channel or other transmission should take place during an existing reservation, the nodes that are aware of existing reservations can inform this "unaware" node regarding the existing reservations, e.g. using specific messages. The additional node present in or moving into the wireless network will therefore be also informed regarding existing reservations and can schedule transmissions in accordance therewith.

The existing reservation may be transmitted e.g. by means of enhanced or modified medium access protocol messages, allowing to avoid the need of additional medium access for exchanging the reservation information.

Still further, an additional node moving into the wireless network may be informed by other nodes, e.g. nodes in the vicinity, regarding existing reservations upon moving into the network.

In the following a further embodiment of the invention will be described with regard to FIG. 7.

Figure 7:
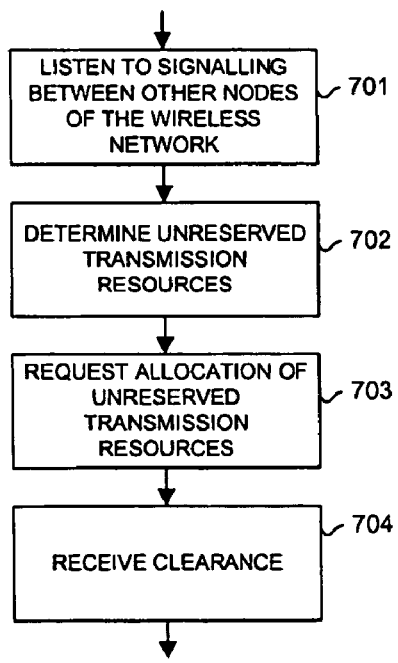
FIG. 7 illustrates operations for distributed medium access control in a wireless system for establishing a virtual channel according to an embodiment of the invention, particularly illustrating steps for determining unreserved transmission resources.

FIG. 7 illustrates operations of a method in a wireless system with distributed medium access control, particularly illustrating operations to determine unreserved transmission capacity. The operations of FIG. 7 may be carried out using the system shown in FIG. 1 or 6, however, the embodiment of FIG. 7 is not limited thereto.

The operations of FIG. 7 may be carried out by a node of a wireless system present in the wireless system or moving into the wireless system as a new participant. In a first operation 701 the node listens to signaling between other nodes of the wireless network, e.g. by receiving and analyzing messages, data packets or other virtual channel requests in the network. As noted before, reservation information may be included in the received and analyzed transmissions, and therefore, in an operation 702 the node can determine unreserved transmission resources of the wireless system. For example, the unreserved transmission resources may pertain to a repeating time period, a transmission frequency, and/or a transmission code.

Thereafter, in an operation 703 the node may use the unreserved transmission resources for generating a virtual channel request, requesting the allocation of the unreserved transmission resources. This request will be forwarded to the destination node, which, in response thereto, will return a virtual channel clearance towards the originating node, where this clearance is received in an operation 704. Thereafter, the node can start transmissions using the unreserved transmission resources.

The embodiment of FIG. 7 illustrates how a node can analyze transmission activities in the wireless system prior to dispatching a virtual channel request, the virtual channel request being preferably dispatched in a time period or using a transmission resource, which is not occupied, and requesting unreserved transmission resources for a virtual channel.

In the following a further embodiment of the invention will be described with regard to FIG. 8.

Figure 8:
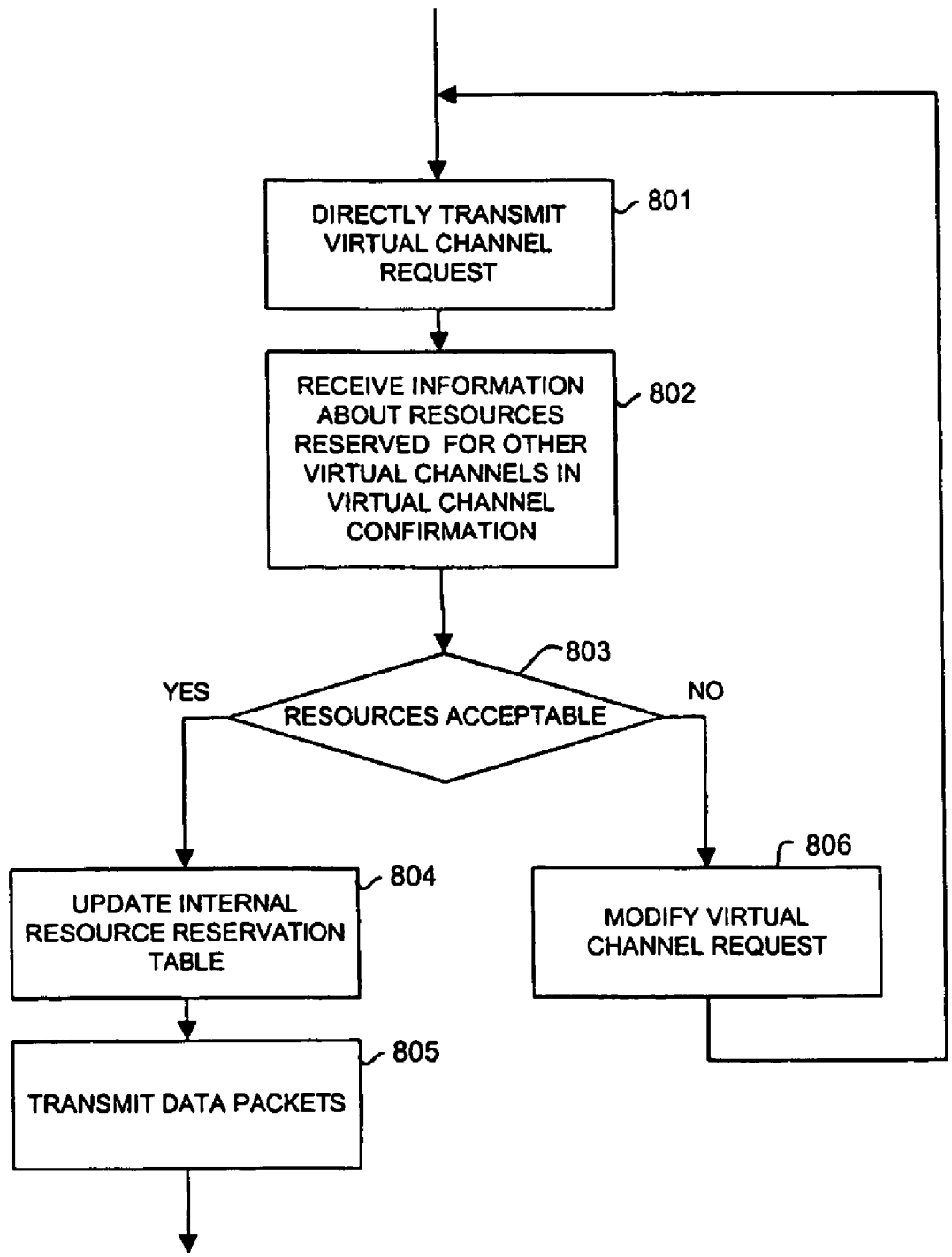
FIG. 8 illustrates operations for distributed medium access control in a wireless system for establishing a virtual channel according to an embodiment of the invention, particularly illustrating operations for reserving resources for a virtual channel.

FIG. 8 illustrates operations for establishing a virtual channel according to a further embodiment of the invention, particularly operations in case of unavailability of the requested resources.

The operations of FIG. 8 may be carried out using the system shown in FIG. 6 or FIG. 1, however, the embodiment of FIG. 8 is not limited thereto.

In a first operation 801 a source node transmits a virtual channel request, as detailed before. This request may be directly transmitted upon determining the necessity for a virtual channel, i.e. be transmitted on a contention basis. Alternatively, as also noted with regard to previous embodiments, the virtual channel request may be transmitted after listening and/or analyzing transmission activities in the network.

Thereafter, in an operation 802, the source node receives information about resources reserved for other virtual channels in a virtual channel confirmation, or may receive information about available or offered resources in the virtual channel confirmation in an operation 802, as outlined with regard to previous embodiments. This information may indicate which resources can be made available by the intermediate nodes and/or destination node along the transmission path for the virtual channel, as noted with regard to previous embodiments. The virtual channel confirmation may indicate that the requested resources are not available, however, that alternate resources are available and can be reserved or are already reserved.

In an operation 803, upon receiving the virtual channel confirmation, the source node may determine, whether the offered resources or the available resources are acceptable. This decision may be based on minimum requirements for the virtual channel, e.g. a data throughput rate, a real time requirement and similar, in case of a quality of service requirements.

If in operation 803 the decision is "YES", indicating that the offered or available resources are acceptable, in an operation 804 the source node may update an internal resource reservation table, indicating which resources of the wireless system are already reserved. The reserve reservation information may also be propagated to further nodes of the wireless system, as noted before.

Thereafter, in an operation 805 the source node can transmit data packets through the virtual channel using the transmission resources. Prior to operation 805 the source may, if the resources are not already reserved, transmit an additional reservation message, informing the intermediate nodes and destination node regarding acceptance of the offered transmission resources.

Alternatively, if in operation 803 the decision is "No", indicating that the offered resources are not acceptable, in an operation 806 the source node may modify the virtual channel request and retransmit the virtual channel request. The modification may be based on the information regarding available transmission resources and/or modified characteristics of the virtual channel, which is to be established. After operation 806 the flow returns to operation 801, to the transmission of a virtual channel request.

In the following, a further embodiment of the invention will be described with regard to FIG. 9.

Figure 9:
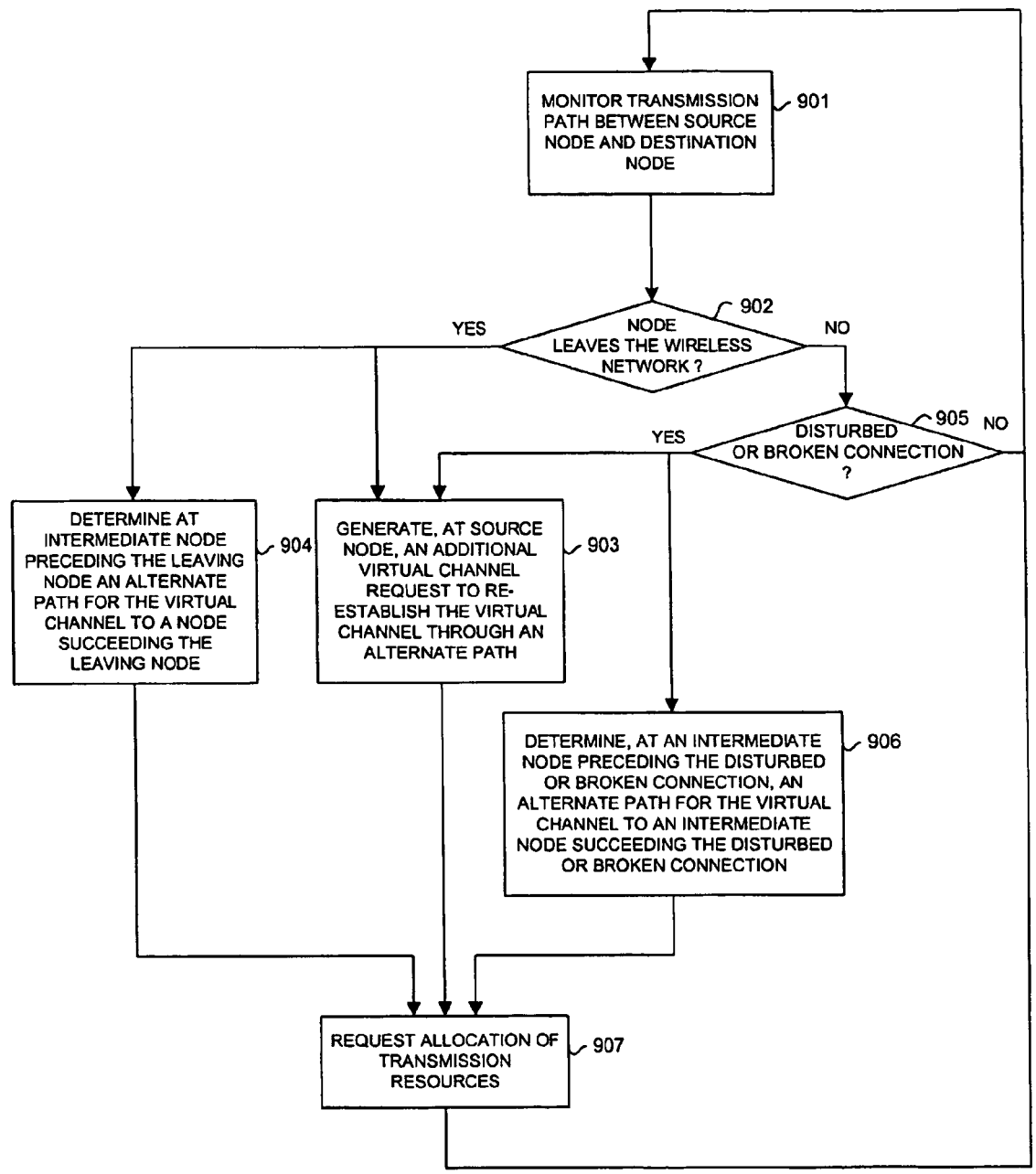
FIG. 9 illustrates operations for distributed medium access control in a wireless system for establishing a virtual channel according to an embodiment of the invention, particularly illustrating operations for preparing or re-establishing a virtual channel or a portion thereof.

FIG. 9 illustrates operations of a method in a wireless system with direct medium access control according to another embodiment of the invention, particularly illustrating operations in case the virtual channel is disturbed or broken. The operations illustrated in FIG. 9 may be carried out using the system shown in FIG. 1 or 6, however, the embodiment of FIG. 9 is not limited thereto.

As noted before, the virtual channel is established for the entire duration of the communication between a source node and a destination node. Accordingly, as the virtual channel may have a significant duration, it may at one point be disturbed or broken, e.g. due to dynamic modification of the wireless system, for example if a participating node enters the network, or if interference due to other transmissions in the network or other networks increase.

It is therefore advantageous to provide means for re-establishing or repairing a broken or deteriorated virtual channel, to avoid interruption of services, e.g. during an ongoing transmission.

In order to detect a bad or broken connection of a virtual channel, in a first operation 901, a transmission path between the source node and the destination node is monitored. The source node, or any other entity of the network, or a plurality of entities of the network may control the monitor operations. For example, the source node could interrogate the intermediate node along the transmission path regarding the status of the virtual channel, or the nodes along the transmission path could report a status of the virtual channel to the source node or any other entity of the network, e.g. in periodic intervals.

Based on this information, in an operation 902 it can then be determined, whether a node is about to leave the wireless network. For example, if a node leaves the wireless network, a corresponding message could be transmitted to any interested party, such as other nodes of the network using the leaving node as an intermediate node. Otherwise, it could be simply detected that a node is no longer actively transmitting.

If in operation 902 the decision is "YES", indicating that a node leaves the network, in an operation 903, as a first alternative, the source node can generate an additional virtual channel request, to re-establish the virtual channel through an alternate path. This alternate path can be established as it was outlined with regards to the previous embodiments, refraining from establishing the alternate path through the node leaving or about to leave the network.

As an alternative, an intermediate node preceding the leaving node could establish an alternate path for the virtual channel to a node succeeding the leaving node. Therefore, the virtual channel could be locally repaired, via an alternate path bypassing the leaving node. The bypass could be established using a virtual channel request issued by the node preceding the leaving node towards the node succeeding the leaving node, leading to the establishment of a 'repair' virtual channel from the node preceding the leaving node to the node succeeding the leaving node, which can then be integrated into the virtual channel from a source node to the destination node.

If in operation 902 the decision is "NO", indicating that none of the nodes participating in maintaining the virtual channel has left, in operation 905 it is determined whether a connection of the virtual channel is disturbed or broken. A connection could be a sub-portion of the communication path between the source node and the destination node, and a connection can be broken or disturbed, if network characteristic change, e.g. if a network load increases, interferences with other networks, relocation of one of the intermediate nodes, topology changes or changing topographical conditions and similar. A connection could also be considered disturbed or broken, if a transmission quality is below a certain threshold, e.g. if an error rate is above a certain threshold.

If in operation 905 the decision is "YES", indicating that a connection is disturbed or broken, the flow may continue, in a first alternative, to operation 903, leading to a re-establishment of the virtual channel through an alternate path, as noted before.

According to another alternative, in operation 906, it can be determined at an intermediate node perceiving the disturbed or broken connection, an alternate path for the virtual channel to an intermediate node succeeding the disturbed or broken connection. Thus, similar to operation 904, a local repair of the virtual channel can be carried out.

If in operation 905 the decision is "NO", indicating that none of the connections is disturbed or broken, the flow can return to operation 901, continuing with a monitoring of the virtual channel.

After operation 903, 904 and 906, in an operation 907, an allocation of transmission resources in accordance with the selected alternative can be carried out and the virtual channel can be re-established or locally repaired.

While some of the above embodiments have been described in association with flowcharts, the elements of the wireless system, as shown in FIG. 1 and FIG. 6, may be adapted to carry out the above functionality.

More precisely, the request handler shown in FIG. 1 may be adapted to listen to a signaling between other nodes of the wireless network in order to determine unreserved transmission resources of the wireless network. Moreover, the request handler may request using the virtual channel request, an establishment of a virtual channel using the determined unreserved transmission resources. In this regard, the request handler may analyze virtual channel requests or data packets including reservation information of other nodes to determine at least one of unreserved time periods, an unreserved transmission frequency and/or unreserved transmission codes.

According to an alternative, the request handler may be adapted to request, with the virtual channel request, at least one intermediate node and destination node to determine transmission resources for the virtual channel and to reserve the transmission resources, if available.

If the transmission resources are not available as requested, the request handler may also request, with the virtual channel request, each of the at least one intermediate node and the destination node, to determine alternative available transmission capacity during an alternate repeating time period, an alternate frequency, or using an alternate transmission code. The request handler may therefore ask, with the virtual channel request, the intermediate node or nodes and the destination node to calculate individual time delays associated with a transmission using an alternate available transmission capacity and to report same to the source node, e.g. using the virtual channel confirmation. The request handler may then determine a total time delay for the virtual channel based on the individual time delays reported, and may accept the virtual channel, if the total time delay does not exceed a predetermined maximum delay.

Similarly, the source node may obtain information on alternate transmission frequencies and/or transmission codes, and may determine, whether the alternately offered resources are acceptable.

For handling a bad or broken connection, the request handler may monitor the transmission path between the source node and the destination node, to determine whether at least one of the intermediate nodes leaves the wireless network, or if a connection is disturbed or broken. Further, in order to repair the virtual channel, the request handler may emit an additional virtual channel request to re-establish the virtual channel through an alternate path, if one of the at least one intermediate nodes leaves the wireless network, or if a connection is disturbed or broken, as outlined above.

The communication handler may further perform a synchronization of the clocks with the clocks of the at least one intermediate node and the destination node using periodic transmissions of a virtual channel. Thus, even if an overall clock reference is unavailable, the source node, the intermediate nodes and the destination node can synchronize clocks based on actual transmissions.

Still further, the request handler may be adapted to transmit the reservation information in association with messages or data packets or message or packet headers according to a communication protocol, particularly according to the IEEE 802.11 standard. Finally, the wireless network may be a multi-hop wireless network and/or may form part of a cellular network.

It is noted that a program or programs may be provided having instructions adapted to cause a data processing device or a network of data processing devices to realize elements of the above embodiments and to carry out the method of at least one of the above operations.

Also, a computer-readable medium may be provided having a program embodied thereon, where the program is to make a computer or a system of data processing devices to execute functions or operations of the features and elements of the above-described examples. A computer-readable medium can be a magnetic or optical or other tangible medium on which a program is recorded, but can also be a signal, e.g. analog or digital, electronic, magnetic or optical, in which the program is embodied for transmission.

Further, a data structure or a data stream may be provided including instructions to cause data processing means to carry out the above operations. The data stream or the data structure may constitute the computer-readable medium. Still further, a computer program product may be provided comprising the computer-readable medium.

The invention claimed is:

1. A method of virtual channel reservation in a wireless network with distributed medium access control, including:
   transmitting, from a source node, a virtual channel request over a transmission path including at least one intermediate node to a destination node, the virtual channel request requesting an allocation of transmission resources for the virtual channel from the source node through the at least one intermediate node to the destination node;
   receiving, in the source node, a virtual channel confirmation from the destination node, the virtual channel confirmation indicating an allocation of the resources for the virtual channel request; and
   transmitting data from the source node to the destination node using the allocated transmission resources,
   wherein the source node or an intermediate nod, in the at least one intermediate nod, to signaling between other nodes of the wireless network to determine unreserved transmission resources in the wireless network and wherein the virtual channel request requests establishment of the virtual channel using the determined unreserved transmission resources.

2. The method of claim 1, wherein the transmission resources include at least one of a repeating time period for transmission, a transmission frequency and a transmission code.

3. The method of claim 1, wherein the virtual channel request includes reservation information on at least one of the duration of the time period, a repetition of a time period and a time reference.

4. The method of claim 1, wherein reservation information is transmitted in association with messages or data packets according to a communication protocol, particularly according to the IEEE 802.11 standard.

5. The method of claim 1, wherein the source node or the at least one intermediate node analyses virtual channel requests or data packets including reservation information of other nodes, or analyzes release messages, to determine at least one of unreserved time periods, a transmission frequency and a transmission code.

6. The method of claim 1, wherein the virtual channel request requests the at least one intermediate node and the destination node to determine the transmission resources for the virtual channel and to reserve the transmission resources, if available.

7. The method of claim 6, wherein each of the at least one intermediate node and the destination node, if available transmission capacity during a repeating time period is not available, determine alternate available transmission capacity during an alternate repeating time period.

8. The method of claim 6, wherein each of the at least one intermediate node and the destination node calculates individual time delays associated with a transmission using an alternate available transmission capacity and report same to the source node.

9. The method of claim 8, wherein the source node determines a total time delay for the virtual channel based on the individual time delays and accepts the virtual channel, if the total time delay does not exceed a predetermined maximum delay.

10. The method of claim 1, wherein an additional node present in or moving into the wireless network determines the unreserved transmission resources and starts transmission of data using the unreserved transmission resources.

11. The method of claim 1, wherein an additional node present in or moving into the wireless network analyses virtual channel requests or data packets including reservation information of other nodes, or analyzes release messages, to determines the unreserved transmission resources.

12. The method of claim 1, including monitoring the transmission path between the source node and the destination node to determine whether the at least one of the intermediate nodes leaves the wireless network or if a connection is disturbed or broken.

13. The method of claim 1, wherein, if one of the at least one intermediate nodes leaves the wireless network or if a connection is disturbed or broken, the source node emits an additional virtual channel request to re-establish the virtual channel through an alternate path.

14. The method of claim 1, wherein, if one of the at least one intermediate nodes leaves the wireless network, an intermediate node preceding the leaving intermediate node determines an alternate path for the virtual channel to an intermediate node succeeding the leaving intermediate node.

15. The method of claim 1, including, if a connection between nodes is disturbed or broken, at an intermediate node preceding a disturbed or broken connection, determining an alternate path for the virtual channel to an intermediate node succeeding the disturbed or broken connection.

16. The method of claim 1, wherein the source node, the at least one intermediate node and the destination node synchronize clocks using a periodic transmissions of the virtual channel.

17. The method of claim 1, wherein the wireless network is a multi hop wireless ad hoc network and/or forms part of a cellular network.

18. A computer program embodied in a computer readable tangible medium having instructions adapted to carry out the following steps:
   transmitting, from a source node, a virtual channel request over a transmission path including at least one intermediate node to a destination node, the virtual channel request requesting an allocation of transmission resources for a virtual channel from the source node through the at least one intermediate node to the destination node, wherein the source node or an intermediate node, in the at least on intermediate node, listens to signaling between other nodes of a wireless network to determine unreserved transmission resources in the wireless network and wherein the virtual channel request requests establishment of the virtual channel using the determined unreserved transmission resources;
   receiving, in the source node, a virtual channel confirmation from the destination node, the virtual channel confirmation indicating an allocation of the resources for the virtual channel; and
   transmitting data from the source node to the destination node using the allocated transmission resources.

19. A computer readable tangible medium, in which a program is embedded thereon, wherein the program is to make a data processing device execute the following steps:
   transmitting, from a source node, a virtual channel request over a transmission path including at least one intermediate node to a destination node, the virtual channel request requesting an allocation of transmission resources for the virtual channel from the source node through the at least one intermediate node to the destination node, wherein the source node or an intermediate node, in the at least one intermediate node, listens to signaling between other nodes of a wireless network to determine unreserved transmission resources in a wireless network and wherein the virtual channel request requests establishment of the virtual channel using the determined unreserved transmission resources;

receiving, in the source node, a virtual channel confirmation from the destination node, the virtual channel confirmation indicating an allocation of the resources for the virtual channel; and transmitting data from the source node to the destination node using the allocated transmission resources.

20. A computer readable tangible medium comprising a computer program comprising, wherein the computer program makes a data processing device execute the following steps:

transmitting, from a source node, a virtual channel request over a transmission path including at least one intermediate node to a destination node, the virtual channel request requesting an allocation of transmission resources for the virtual channel from the source node through the at least one intermediate node to the destination node, wherein the source node or an intermediate node, in the at least one intermediate node, listens to signaling between other nodes of a wireless network to determine unreserved transmission resources in a wireless network and wherein the virtual channel request requests establishment of the virtual channel using the determined unreserved transmission resources;

receiving, in the source node, a virtual channel confirmation from the destination node, the virtual channel confirmation indicating an allocation of the resources for the virtual channel; and transmitting data from the source node to the destination node using the allocated transmission resources.

21. A source node in a wireless network with distributed medium access control, including:

a request handler, in the source node, for transmitting a virtual channel request over a transmission path including at least one intermediate node to a destination node, the virtual channel request requesting an allocation of transmission resources for the virtual channel from the source node through the at least one intermediate node to the destination node and for receiving, at the source node, a virtual channel confirmation from the destination node, the virtual channel confirmation indicating the allocation of the transmission resources for the virtual channel; and a communication handler, in the source node, for transmitting data from the source node to the destination node using the allocated transmission resources, wherein the request handler is adapted to listen to signaling between other nodes of the wireless network to determine unreserved transmission resources in the wireless network and wherein the virtual channel request requests establishment of the virtual channel using the determined unreserved transmission resources.

* * * * *